United States Patent [19]

Cage et al.

[11] 4,102,232
[45] Jul. 25, 1978

[54] SAW TOOTH INSERT

[75] Inventors: Kenneth M. Cage, Marysville; C. Warren Turner, Redmond, both of Wash.

[73] Assignee: Black Clawson Inc., Everett, Wash.

[21] Appl. No.: 773,751

[22] Filed: Mar. 2, 1977

[51] Int. Cl.² .................. B27B 33/02; B27B 33/08
[52] U.S. Cl. .................................. 83/854; 83/855; 407/61
[58] Field of Search ............ 29/95 R, 105 R; 83/852, 83/853, 854, 855, 839, 835; 144/222, 223, 230; 76/112; 407/56, 61

[56] References Cited

U.S. PATENT DOCUMENTS 3,154,839  11/1964  Kleber .................................. 29/95 R
3,358,720  12/1967  Henderson ............................. 83/855

Primary Examiner—Robert Louis Spruill
Attorney, Agent, or Firm—Biebel, French & Nauman

[57] ABSTRACT

A saw tooth insert, for securing to a saw plate, comprises a front cutting surface containing two adjacent grooves extending for substantially the entire height of the cutting face and substantially radially outward from the rotational axis of the saw plate. The lower portions of the grooves end on opposite sides of the saw plate and the upper portions of the grooves form a central cutting edge between them and external cutting edges on each side of the cutting face where the grooves meet the side surfaces of the insert.

11 Claims, 11 Drawing Figures

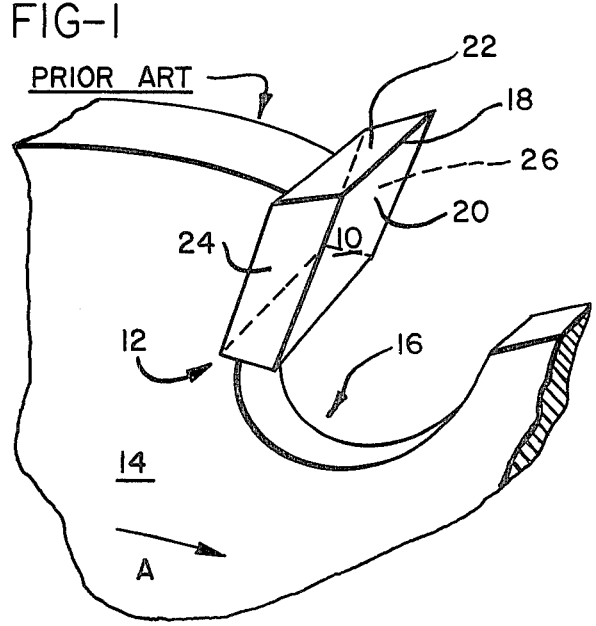
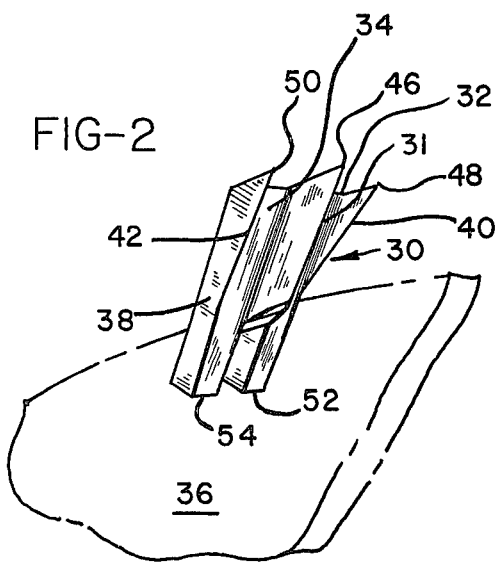
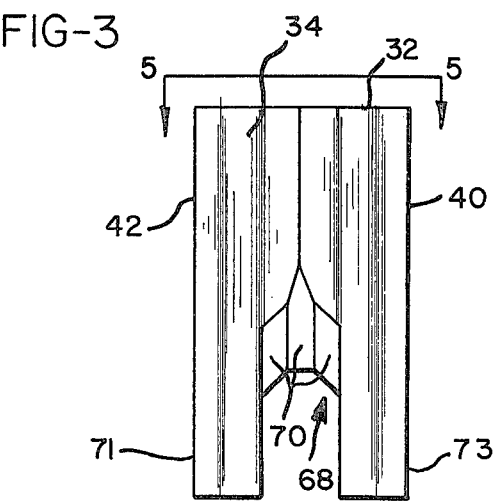
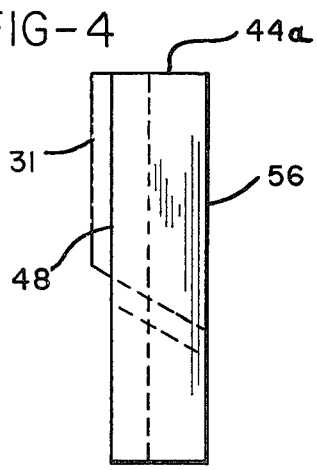
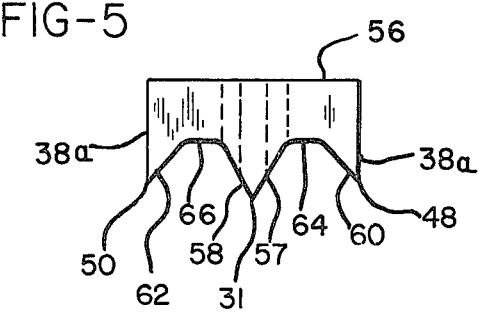

SAW TOOTH INSERT

BACKGROUND OF THE INVENTION

1. Field of the Invention

The present invention relates to saw teeth, and more particularly to saw tooth inserts which are secured to the outer peripheral edge portion of a saw plate.

2. Prior Art

Many saw teeth and saw tooth inserts have been designed for various special applications such as producing a smooth surface where wood or other material has been cut, taking out large amounts of material as rapidly as possible where smoothness of the cutting edge is not as important, or for cutting through particular types of material.

In the case of rough cutting of lumber such as at a saw mill, for example, to which the present invention is more particularly directed although it could be utilized in many other situations, the saw teeth have generally been designed with the idea of removing as much material as fast as possible in order to maximize the economic efficiency of the lumbering operation. To this end, many teeth have been designed which basically provide a leading cutting edge at the top of each tooth and various contours of side surfaces to reduce friction between the cutting edge and the work piece being sawed. A more recent form of design of this nature is disclosed, for example, in U.S. Pat. No. 3,901,114.

In the lumbering industry in particular, the teeth are usually formed as inserts which are then secured by brazing or soldering to a saw plate of conventional design in which a gullet is formed in the saw plate below the tooth, and the tooth is mounted on the backing portion of the gullet. This construction permits the chip cut out of the work piece to be removed radially inward on the saw plate and be disposed of as the tooth passes through the work piece.

This basic construction has been one of the major limiting disadvantages associated with such prior art tooth designs in that the size of the chip of material removed from the work piece is limited since it is difficult to remove larger chips without creating a binding between the saw tooth and the work piece. This is particularly true in the case of a helical saw such as is disclosed in U.S. Pat. No. 3,504,718 which permits each tooth to make only a single pass through the work piece since the piece is continuously moving laterally through the saw.

SUMMARY OF THE INVENTION

The present invention overcomes the above described difficulties and disadvantages associated with the prior art devices by providing a saw tooth insert which has a front cutting face containing two adjacent grooves extending for substantially the entire height of the cutting face and substantially radially outward from the rotational axis of the saw plate on which it is mounted, with a central cutting edge formed between the two grooves such that a material chip removed from the work piece is split in half and channeled down each groove along each side of the saw plate so that it can be discarded radially inward of the saw plate without causing binding between the saw tooth insert and the work piece.

In the preferred form, the central edge formed in the cutting face between the adjacent grooves is a leading edge protruding beyond the two side edges formed where each groove meets the adjacent side surface of the insert so that the central cutting edge scribes a separation line on the material chip to be removed before the entire top cutting edge of the insert actually removes the chip from the work piece.

The top surface of the saw tooth insert is preferably angled rearwardly and radially inward to produce a sharp knife-like top cutting edge on the insert.

With this novel tooth insert design, a saw plate having a smooth cylindrical peripheral edge may be utilized rather than the prior art saw plate in which gullets are necessary to remove the chips taken from the work piece. The tooth can be mounted on the peripheral edge of the saw plate either radially perpendicular to the tangent at the point where the insert is placed or at a forward leading angle of preferably not greater than 30° relative to a radial plane.

Each saw tooth insert is mounted to the saw plate by means of a saddle-shaped groove formed in the lower portion of the insert producing leg portions which straddle the saw plate and preferably contain the grooves that channel the split chips down each side of the saw plate.

BRIEF DESCRIPTION OF THE DRAWINGS

FIG. 1 is a pictorial illustration of a prior art saw tooth insert secured to the backing surface of a conventional saw plate;

FIG. 2 is a pictorial illustration of a preferred embodiment of the present invention mounted on a saw plate having a smooth cylindrical peripheral edge;

FIG. 3 is a front elevational view of a partially machined saw tooth insert blank of a preferred embodiment of the present invention;

FIG. 4 is a side elevational view of the embodiment of FIG. 3;

FIG. 5 is a top plan view of the embodiment illustrated in FIG. 3;

DETAILED DESCRIPTION OF THE PREFERRED EMBODIMENTS

Figure 6:
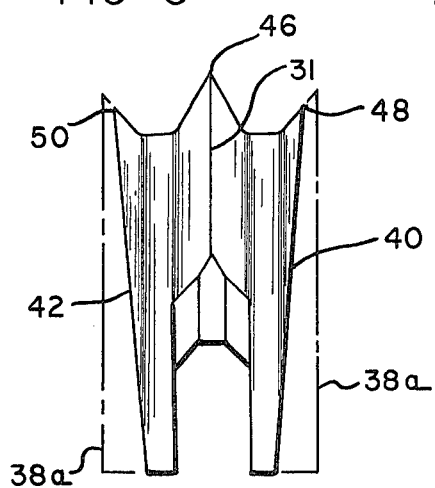
FIG. 6 is a front elevational view of a completed saw tooth insert of the preferred embodiment of the present invention made from the partially completed blank of FIG. 3.

FIG. 1 illustrates the type of tooth and saw plate commonly found in the prior art in which the saw tooth insert 10 is normally secured to what is commonly referred to as the backing portion 12 of a conventional saw plate 14 containing a gullet 16 formed in front of the tooth insert 10. The gullet 16 is formed in the saw plate 14 in order to provide a cavity in which the chips removed from the work piece may be temporarily lodged until they are removed from the saw as the tooth leaves the work piece. The prior art tooth insert 10 generally comprises a front cutting edge 18 formed between a front surface 20 and top surface 22. The side surfaces 24 and 26 are generally tapered radially inward from the top surface 22 and tapered tangentially rearward from the front surface 20, in order to reduce the frictional engagement with the work piece, thus decreasing the power consumption of the saw.

When such a prior art tooth insert 10 is used to cut wood, for example, the saw rotates in the direction of arrow A, and the cutting edge 18 peels off a chip which is guided radially inward along the front surface 20 and into the gullet 16 where it remains until the tooth leaves the work piece and then is discarded as the saw revolves.

The present invention, however, as illustrated by a first embodiment in FIG. 2, utilizes an entirely different principle of design and function. The embodiment of the saw tooth insert 30 illustrated in FIG. 2, has a central cutting edge 31 formed between adjacent grooves 32 and 34 which are formed in the front cutting face of the insert and extend for substantially the entire height of the cutting face radially outward from the rotational axis of the saw plate 36. The groove surfaces 32 and 34 join the outer side surfaces 38 to form side cutting edges 40 and 42, respectively.

The top surface 44 (shown in FIG. 8) intersects the front cutting face so as to form a central cutting point 46 with the central cutting edge 31, and two side cutting points 48 and 50 with the side edges 40 and 42, respectively. The center cutting point 46 preferably protrudes forward and above the side cutting points 48 and 50, and the front cutting edge 31 is forward of the side cutting edges 40 and 42.

This construction causes a line to be scribed on the work piece by center point 46 in advance of contact with the piece by the top cutting edges formed between the front cutting face and the top surface 44 as well as the cutting points 48 and 50. This results in the chip being split in two by the front cutting edge 31 as the insert cuts through the work piece, and causes each split chip to advance radially inward on each side of the saw plate 36, along grooves 32 and 34. The chips can then pass out of the work piece past the bottom edges 52 and 54 of grooves 32 and 34, respectively without causing binding between the insert and the work piece.

The side surfaces 38 which preferably converge from the top surface 44 may also either converge rearwardly toward the back surface 56 disposed in a substantially radial plane or be perpendicular to that plane. This convergence is well known in the art and is referred to as tangential clearance. The angle of the side surface relative to the plane containing the saw plate is preferably in the range of 0° to 5° to produce the desired tangential clearance.

Referring now to the manner in which the embodiment illustrated in FIG. 2 is formed, a rectangular block of hard alloy steel or other strong durable material, such as tungsten carbide, is first shaped as shown in FIG. 3 with the two grooves 32 and 34 being ground or otherwise formed in what will become the front cutting face of the insert.

The grooves 32 and 34 are formed with inside flat surfaces 57 and 58, as shown in FIG. 5, which are perpendicular to the top surface 44a and intersect to form the leading edge 31. The outer flat surfaces 60 and 62 of grooves 32 and 34, respectively, are also preferably flat and perpendicular to the top surface 44a.

The back surfaces 64 and 66 of grooves 32 and 34, respectively, are flat and parallel to the back surface 56 of the insert and are blended into the side surfaces with radii, for example, surfaces 57 and 60 of groove 32, so as to form a smooth transition between the side surfaces and the back surfaces. The side edges 40 and 42 are formed by the intersection of outside surfaces 60 and 62 of grooves 32 and 34, respectively, with side surfaces 38a so as to be rearward of the center edge 31 as best shown in FIG. 5.

A U-shaped opening 68 is formed in a bottom portion of the insert 30 with a plurality of lands 70 which conform to the peripheral edge configuration of the saw plate 36, and with leg portions 71 and 73 which fit snuggly on each side of the saw plate.

At this stage of producing the insert 30, it is secured to the peripheral edge of the saw plate 36, preferably by silver soldering or blazing, depending upon the material from which the saw plate and the inserts are made. Since the side edges 48 and 50 of the insert 30 are in planes parallel to the plane of the saw plate, this permits the inserts to be easily aligned with the saw plate for soldering without the use of additional jigs for aligning the insert with the saw plate. In addition, the design of the U-shaped opening 68 assists in aligning the insert on the saw plate.

The lands 70 of U-shaped opening 68 preferably slope downwardly and rearwardly from the front cutting face at any desired angle between 0° and 30° relative to a tangential plane of the saw plate. The actual angle will depend upon the type of material to be cut and the desired angle of the cutting face relative to the surface of the work piece, for greater or lesser material removal.

Figure 7:
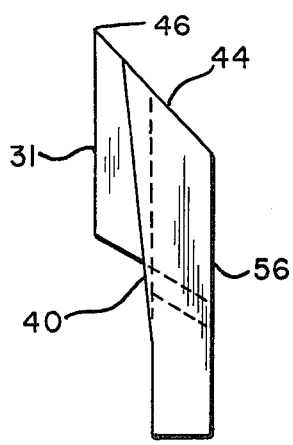
FIG. 7 is a side elevational view of the embodiment shown in FIG. 6.
Figure 8:
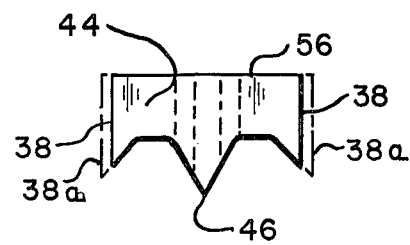
FIG. 8 is a top plan view of the embodiment shown in FIG. 6.

Once the partially constructed insert has been soldered or otherwise secured to the saw plate, it is then ground to the configuration as shown in FIGS. 6–8. The side surfaces 38 are ground so that they will remain flat but will converge radially inward from the top surface 44 of the insert. The previously perpendicular top face 44a will be ground at an angle rearwardly preferably 45° although other angles can be utilized depending on the type of wood being cut, and radially inwardly from its original position, and side edges 48 and 50 will also be ground to extend rearwardly from the top surface 44 as shown in FIG. 7.

As previously mentioned, the side surfaces 38 may also be angled so as to converge relative to the back surface 56 of the insert, at any angle between 0° and 5° for each side relative to the back surface, in order to provide tangential clearance for the insert in the work piece.

Figure 9:
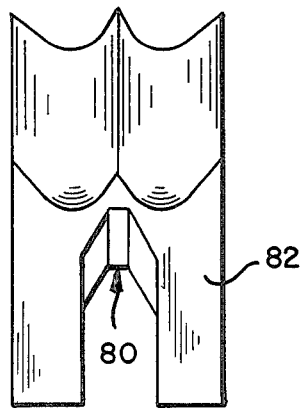
FIG. 9 is a front plan view of a second preferred embodiment of the present invention.
Figure 10:
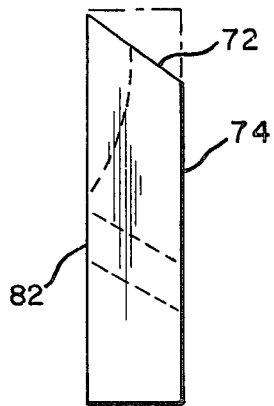
FIG. 10 is a side elevational view of the embodiment shown in FIG. 9.
Figure 11:
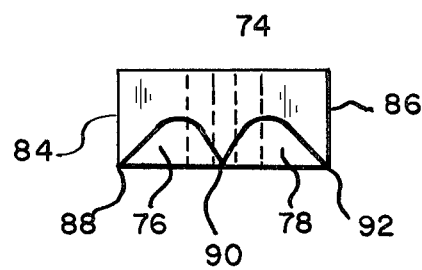
FIG. 11 is a top plan view of the embodiment shown in FIG. 9.

A second embodiment of the present invention is illustrated in FIGS. 9 and 11 wherein the top surface 72 is ground at 35° relative to the back surface 74, and grooves 76 and 78 are formed in a slightly different manner than the grooves 32 and 34 of the first embodiment. The grooves 76 and 78 do not extend substantially vertically down the front face of the insert, but are radiused from the top surface outwardly to the front cutting surface where they intersect the front cutting surface just above the U-shaped opening 80 formed therein.

The inside surfaces of grooves 76 and 78 are flat for the most part and blend into a radiused bottom portion in each groove which extends from the top surface 72 to the front face 82 of the insert. The U-shaped opening 80 formed in the bottom portion of the insert is the same as U-shaped opening 60 in the first embodiment. Also, the side surfaces 84 and 86 may be shaped to provide tangential clearance of the saw blade as discussed with regard to the first embodiment. Also, it is to be noted that the three cutting edges 88, 90, and 92 are all in the same plane as opposed to the leading position of edge 31 relative to edges 40 and 42 in the first embodiment.

Although the foregoing illustrates the preferred embodiments of the present invention, many variations are possible. All such variations as would be obvious to one skilled in this art are intended to be included within the scope of the invention as defined by the following claims.

What is claimed is:

1. A saw tooth insert secured to a saw plate having an uninterrupted outer edge portion defining a surface of revolution for cutting wood or the like, said saw tooth insert having a front cutting face containing two adjacent grooves extending along the cutting face substantially radially outward from the rotational axis of said saw plate, with lower portions of said grooves ending on opposite sides of said saw plate, and upper portions of said grooves forming a central cutting edge between them such that a chip of material being sawed will be split in two with a portion being directed by each said groove along each side of said saw plate toward said axis, said insert further having a U-shaped opening formed in the lower central portion of the insert forming lower leg portions on said insert of equal width such that they can be disposed on opposite sides of said saw plate for securing said insert thereto and forming a saddle-shaped portion configured to mate with the outer peripheral edge portion of said saw plate.

2. A saw tooth insert as defined in claim 1 wherein said grooves extend for substantially the entire height of said cutting face.

3. A saw tooth insert is defined in claim 2 wherein the top surface of the insert is angled downwardly and rearwardly from said front cutting surface, and said grooves intersect said top surface so as to form a center point between said grooves and two side points, said grooves also intersecting side surfaces of said insert so as to form an outside cutting edge on each side of said cutting face.

4. A saw tooth insert as defined in claim 3 wherein said central cutting edge protrudes forward of said side cutting edges.

5. A saw tooth insert as defined in claim 4 wherein said side surfaces of said insert are angled radially inwardly from said top surface of said insert.

6. A saw tooth insert as defined in claim 5 wherein said side cutting edges of said insert are angled inwardly and rearwardly from said top of the insert.

7. A saw tooth insert as defined in claim 1 wherein said insert is symmetrical about a plane containing said saw plate on which said insert is mounted.

8. A plurality of saw tooth inserts as defined in claim 1 mounted in equally spaced relation around the peripheral edge of a helically-shaped saw plate.

9. A saw tooth insert as defined in claim 1 wherein said saddle-shaped portion of said U-shaped opening has a top mating surface disposed at a downwardly and rearwardly sloping angle of not greater than 30° relative to a plane transversely perpendicular to said central cutting edge.

10. A saw tooth insert as defined in claim 9 wherein said center point formed between said grooves has sloping side surfaces forming an included angle of substantially 60 degrees.

11. A saw tooth insert as defined in claim 10 wherein said side surfaces of said insert are angled inwardly, and rearwardly from said cutting face.

* * * * *